(12) United States Patent
Møllerhøj

(10) Patent No.: US 9,487,401 B2
(45) Date of Patent: Nov. 8, 2016

(54) PROCESS FOR THE OXIDATION OF $SO_2$ TO $SO_3$

(71) Applicant: Haldor Topsøe A/S, Kgs. Lyngby (DK)

(72) Inventor: Martin Møllerhøj, Birkerød (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/406,155

(22) PCT Filed: Jun. 3, 2013

(86) PCT No.: PCT/EP2013/061342
§ 371 (c)(1),
(2) Date: Dec. 5, 2014

(87) PCT Pub. No.: WO2013/182502
PCT Pub. Date: Dec. 12, 2013

(65) Prior Publication Data
US 2015/0147266 A1  May 28, 2015

(30) Foreign Application Priority Data

Jun. 6, 2012 (WO) .................. PCT/EP2012/060703

(51) Int. Cl.
| | | |
|---|---|---|
| C01B 17/76 | (2006.01) | |
| C01B 17/765 | (2006.01) | |
| C01B 17/80 | (2006.01) | |
| B01J 8/02 | (2006.01) | |

(52) U.S. Cl.
CPC ............ C01B 17/806 (2013.01); B01J 8/0285 (2013.01); C01B 17/76 (2013.01); C01B 17/765 (2013.01); C01B 17/803 (2013.01); B01J 2208/00256 (2013.01); B01J 2208/027 (2013.01)

(58) Field of Classification Search
CPC . C01B 17/765; C01B 17/803; C01B 17/806; C01B 17/76; B01J 2208/00256; B01J 2008/027; B01J 8/0285
See application file for complete search history.

(56) References Cited

U.S. PATENT DOCUMENTS

| | | | | |
|---|---|---|---|---|
| 5,503,821 A | * | 4/1996 | McAlister | ............. C01B 17/765 423/522 |
| 8,926,936 B2 | * | 1/2015 | Hansen | ................ B01D 5/0039 165/110 |

(Continued)

FOREIGN PATENT DOCUMENTS

| | | | | |
|---|---|---|---|---|
| AU | 2012239081 A1 | * | 10/2013 | ........... B01D 5/0039 |
| CN | 2280087 Y | | 4/1998 | |
| CN | 101626977 A | | 1/2010 | |
| CN | 102336396 A | | 2/2012 | |

(Continued)

*Primary Examiner* — Timothy Vanoy
(74) *Attorney, Agent, or Firm* — Blank Rome LLP

(57) ABSTRACT

The present invention relates to a process plant for the oxidation of $SO_2$ to $SO_3$ in a process gas, said process plant comprising a heat exchanger configured for heating the process gas by heat exchange with an oxidized process gas and/or a further oxidized process gas by providing thermal contact between said process gas and said oxidized process gas and/or said further oxidized process gas, a first zone of material catalytically active in oxidation of $SO_2$ to $SO_3$, and a boiler configured for containing steam being heated by the oxidized process gas and/or the further oxidized process after said oxidized process gas has been cooled in the heat exchanger characterized in the cooled oxidized process gas in the boiler being non-condensing with the benefit of providing the possibility for a smaller heat exchanger which may be made with only moderate corrosion resistant materials, compared to a process plant according to the prior art, as well as a related process.

14 Claims, 10 Drawing Sheets

(56) References Cited

U.S. PATENT DOCUMENTS 9,162,890 B2 * 10/2015 Vera-Castaneda .... C01B 17/765
2013/0000869 A1 * 1/2013 Daum ................ C01B 17/7655
                                                        165/104.25

FOREIGN PATENT DOCUMENTS

| DE | 1 567 403 | 7/1970 |
| DE | 195 22 927 A1 | 1/1997 |
| WO | WO 2011/147431 A1 | 12/2011 |

* cited by examiner

PROCESS FOR THE OXIDATION OF $SO_2$ TO $SO_3$

Sulfuric acid, $H_2SO_4$, is made by oxidation of $SO_2$ in a feed gas to $SO_3$ and subsequent hydration to $H_2SO_4$. The $SO_2$ feed gas can come from various sources. One type is off gases from smelters and roasters. Such feed gases are supplied cold and water saturated, typically at 20-50° C., and they contain from about 0.1% vol. $SO_2$ to about 20% vol. $SO_2$. In order for the $SO_2$ to $SO_3$ conversion reaction to run at a reasonable rate, the cold $SO_2$ containing feed gas has to be heated to about 400° C. before it is directed to the catalytic bed.

While the feed gas may be partly heated by e.g. hot cooling air from a wet gas Sulfuric Acid condenser, the final heating to about 400° C. is typically done using the reaction heat from the $SO_2$ converter, as this is the only place in the unit, where such high temperatures are available. In particular, a high temperature outlet from the 1$^{st}$ catalytic bed is advantageous as temperatures well above 400° C. are required to heat the feed to 400° C.

When the $SO_2$ content in the process gas is low (e.g. less than about 2.5% vol.), the reaction heat is insufficient to heat the feed gas. Energy will have to be added, typically by direct or indirect support-firing, encurring a further cost of fuel. To minimize the periods where support-firing is required, the thermal control of a sulfuric acid production plant is important, but the flexibility of thermal management is limited by a number of constraints. For oxidation of $SO_2$ to $SO_3$ to be sufficiently fast, the reaction must take place at a temperature of at least 370-400° C. At the same time the $SO_3$ containing oxidized product gas must be cooled to shift the product equilibrium towards $SO_3$, which limits the temperature and finally gas temperatures must be kept above the dew point of sulfuric acid, since condensed $H_2SO_4$ is in general very corrosive while $H_2SO_4$ in the gas phase is almost not corrosive. Finally the hydration reaction for $SO_3$ is exothermal, which reduces the temperature approach in heat exchangers for wet sulfuric acid gases below about 400° C.

Traditionally the thermal management of a sulfuric acid plant for processing a raw process gas has involved either gas/gas heat exchange, or heat exchange facilitated by an appropriate heat transfer medium such as molten salt. Steam has not been a relevant heat transfer medium, since the process gas temperature obtained from heat exchange with steam has been insufficient for providing the sufficient temperature for $SO_2$ oxidation.

German patent application DE 195 22 927 A1 provides a method for production of concentrated sulfuric acid with improved thermal management based on hydration of $SO_3$ and partial condensation of sulfuric acid in a boiler, in which the $H_2O/SO_3$ ratio is limited to the range 0.9-1.1. Sulfuric acid is hydrated and condensed in a boiler with a steam pressure around 20 bar, with heat exchange tubes made from steel. For a narrow range of sulfuric acid concentration, the liquid sulfuric acid is only moderately corrosive, and regular stainless steel may in theory be an acceptable material. However, if the strict control of $H_2O/SO_2$ is not adhered to condensed sulfuric acid may cause corrosion and leakage of 20 bar steam into a sulfuric acid condenser, which may be critical.

Now according to the present disclosure it has been found that by ensuring that the cooled oxidized process gas is non-condensing in combination with combined heat exchange, i.e. by using a boiler producing steam for heat exchange in combination with either gas/gas heat exchange, or heat exchange facilitated by e.g. a molten salt as heat transfer medium, the temperature approach of the heat exchanger can be increased significantly, resulting in a reduced heat exchange area, and thus significant savings in cost. Furthermore by ensuring that the temperatures are such that the cooled oxidized process gas is non-condensing the $H_2O/SO_2$ ratio is not critical and the heat exchanger materials do not have to be able to withstand the corrosiveness of condensed sulfuric acid. The cooled, but non-condensing, oxidized process gas may be transferred to a downstream air cooled condenser, in which sulfuric acid is condensed, and in which the cooling medium is having a pressure close to that of the cooled oxidized process gas.

As used herein the term temperature approach shall be understood as the difference between the cold and the warm stream of a heat exchanger.

As used herein the term heat exchanger shall be understood as a process unit in which heat is transferred between a cold stream and a warm stream, in which the two streams are physically separated. This means that heat transfer medium facilitated heat exchange typically requires two heat exchangers. Heat exchangers according to the present invention may be of any configuration, including planar or tubular, and may optionally be configured with cooling fins as known to the skilled person As used herein gas/gas heat exchange shall be construed as heat exchange between a cold and a warm stream, in which the thermal contact between the cold and the warm stream only requires transfer of energy across a heat exchanger wall.

As used herein the term heat transfer medium facilitated heat exchange shall be construed as heat exchange between a cold and a warm stream, in which the thermal contact between the cold and the warm stream requires the movement of a heat transfer medium.

As used herein heat transfer shall mean any process transferring energy from one location to another, including gas/gas heat exchange and heat transfer medium facilitated heat exchange as described above, but also convection, conduction, and radiation which may be involved in the heat transfer from e.g. catalytically active material through cooling tubes to a process gas or a heat transfer medium.

As used herein the term heat exchange shall be understood to cover any type of heat transfer including both gas/gas heat exchange, and heat transfer medium facilitated heat exchange as defined above.

As used herein the term boiler shall be understood as a process unit in which heat is transferred from a hot process stream to liquid water at its boiling point, such that steam is released.

As used herein the terms catalyst zone, bed of catalytically active material and catalytic bed shall be construed as equivalent.

As used herein the dew point temperature for a component of a gas is the temperature at which the component condenses from the gas mixture. The dew point is dependent on the—pressure and composition of the gas mixture. The term above the dew point shall be understood as a temperature where the gas mixture is non-condensing, and similar below the dew point shall be understood as a temperature where the gas mixture is condensing.

Equipment having minor surface areas having cold spots potentially inducing condensation shall not be construed as condensing gas conditions.

As used herein autothermal operation shall be understood to mean operation at a $SO_2$ level at which a sulfuric acid plant may operate in steady state with limited or no heat supply, based on the reaction heat of the oxidation of $SO_2$ to $SO_3$ as well as the reaction heat of hydration of $SO_3$ to $H_2SO_4$ and finally condensation of gaseous $H_2SO_4$ to form liquid $H_2SO_4$.

As used herein the term thermal circuit shall be used to describe the process from a thermal perspective, substantially disregarding the chemical reactions and focussing on the heat transfer related to the process.

$Nm^3$ shall mean Normal cubic meter, i.e. the amount of gas corresponding to one $m^3$ at standard conditions, 0° C. and 1 atm.

Where concentrations are stated in % this shall be understood as volumetric %. Unless stated otherwise, the concentrations of $SO_3$ and $H_2O$ are presented as nominal concentrations, i.e. under the assumption of no hydration of $SO_3$ to $H_2SO_4$.

Where the terms partially oxidized process gas, oxidized process gas and further oxidized process gas are used these terms shall be construed only as specifying process gas in relative positions of the same process and not as an indications of the extent of oxidation across different processes.

In a broad embodiment the present invention relates to a process for conversion of $SO_2$ to $SO_3$ in a raw process gas comprising the steps of a) heating the raw process gas by heat exchange with an oxidized process gas, providing a heated process gas
b) contacting the heated process gas with a first zone of material catalytically active in oxidation of $SO_2$ to $SO_3$, providing an oxidized process gas
c) withdrawing heat of reaction from one or both of the first zone of catalytically active material and the oxidized process gas to the raw process gas by one or more heat transfer processes taken from the group consisting of convection, conduction, radiation, gas/gas heat exchange or by heat transfer medium facilitated heat exchange
d) further cooling the oxidized process gas by heat exchange in a boiler, preferably a water tube boiler, receiving a feed of water, providing saturated steam and a cooled oxidized process gas, in which the raw process gas, the heated process gas, the oxidized process gas and the cooled oxidized process gas are non-condensing with respect to sulfuric acid, with the associated benefit of efficient thermal management of the process, with reduced heat exchange area due to increased temperature approach in the heat exchangers, in comparison with the thermal management of the process layout according to the prior art, while at the same time the process equipment may be made from moderately priced materials as corrosion resistance is not critical, and furthermore the temperature variation of the cooled process gas will be low, providing simpler operation of equipment downstream.

In a further embodiment the process further comprises the steps of contacting the heated process gas with one or more further zones of material catalytically active in oxidation of $SO_2$ to $SO_3$, providing a further oxidized process gas, cooling the oxidized process gas and/or the further oxidized process gas by heat exchange with the a process gas upstream the first zone of catalytically active material, in one or more heat exchangers, configured either as inter-bed coolers, as heat exchangers external to the reactor or as integrated heat exchangers in contact with catalyst, with the associated benefit from the use of multiple catalyst zones of providing more optimal temperatures for the oxidation reaction and for the oxidation equilibrium.

In a further embodiment the process further comprises the step of pre-heating the raw process gas by heat exchange with a steam flow, preferably condensing steam, prior to heating the process gas by heat exchange with the oxidized process gas, providing a pre-heated process gas, with the associated benefit of employing the energy available in the steam to ensure non-condensing and thus non-corrosive conditions in the downstream heat exchanger, by ensuring that the temperature of the cold raw process gas side of the heat exchanger is above the dew point of $H_2SO_4$ in the warm oxidized process gas. Furthermore this pre-heating ensures that energy remains in the process such that auto-thermal operation is possible with lower concentrations of $SO_2$.

In a further embodiment the process further comprises the step of mixing a process gas upstream the first zone of catalytically active material with a recycled warm process gas, with the associated benefit of employing the heat available in the recycled process gas to ensure non-condensing conditions in the downstream heat exchanger.

In a further embodiment the heat exchange between the raw process gas and one or more of the oxidized process gas or the further oxidized process gas is in part made by gas/gas heat exchange, with the associated benefit of a simple heat exchange circuit.

In a further embodiment the heat exchange between the raw process gas and one or more of the oxidized process gas, or the further oxidized process gas is made in part by heat exchange facilitated by a heat transfer medium, such as molten salt, with the associated benefit of a heat exchange circuit, with a possibility for heat storage in a buffer of heat transfer medium. The heat transfer medium may comprise molten salts such as an eutectic mixture of sodium and potassium nitrate and/or nitrite or an oil. It is preferred that the heat transfer medium has a boiling point above 450° C.

In a further embodiment the raw process gas fluctuates in one or more of the parameters flow rate, pressure and $SO_2$ concentration, with the associated effect of providing a process enabled to clean the feed gas while safely and efficiently maintaining the process gas temperature at the inlet to the sulfuric acid condenser within the allowable limits, between the sulfuric acid dew point and the maximum allowable operating temperature, in dependence of downstream materials.

In a further embodiment the temperature of the steam is at least 10° C., preferably 15° C. above the $H_2SO_4$ dew point of the cooled oxidized process gas, with the associated benefit of providing a temperature of the cooled oxidized process gas sufficiently high for avoiding corrosion problems due to condensation of sulfuric acid.

In a further embodiment the temperature of the steam is at least 200° C., preferably 240-310° C. and even more preferably 250-280° C., with the associated benefit of providing a cooled oxidized process gas having a temperature above the dew point of a process gas containing at least respectively 0.1% vol. $SO_3$, 0.1-20% vol. $SO_3$, and 0.1-7% vol. $SO_3$.

In a further embodiment the raw process gas contains at least 2% $H_2O$ with the associated benefit of providing water for hydrating $SO_3$ for a downstream condensation of sulfuric acid.

In a further embodiment the pressure of the steam is 30-100 barg, preferably 40-80 barg and even more preferably 40-60 barg, with the associated benefit of providing a process with a higher steam temperature due to an increased water boiling point, as well as a steam circuit matching the requirements of a high pressure steam turbine.

In a further embodiment the heated heat transfer medium is cooled by heat exchange with boiling water or steam with the associated benefit of providing the energy collected from the exothermal oxidation process in accessible form for the remainder of the process.

A further aspect of the present disclosure relates to a process for production of sulfuric acid involving conversion of $SO_2$ to $SO_3$ and subsequent condensation of sulfuric acid in a condenser cooled by heat exchange with a gas such as process gas or air, with the associated benefit of providing a process in which the process heat exchange is separated from the corrosive condensing conditions, such that process equipment materials upstream the condenser does not have to be corrosion resistant.

A further aspect of the present disclosure relates to a process plant for the oxidation of $SO_2$ to $SO_3$ in a process gas, said process plant comprising a heat exchanger configured for heating the process gas by heat exchange with an oxidized process gas and/or a further oxidized process gas by providing thermal contact between said process gas and said oxidized process gas and/or said further oxidized process gas, a first zone of material catalytically active in oxidation of $SO_2$ to $SO_3$, and a boiler configured for containing steam being heated by the oxidized process gas and/or the further oxidized process after said oxidized process gas has been cooled in the heat exchanger characterized in the cooled oxidized process gas in the boiler being non-condensing with the benefit of providing the possibility for a smaller heat exchanger which may be made with only moderate corrosion resistant materials, compared to a process plant according to the prior art.

In a further embodiment this process plant further comprises a heat transfer medium circuit configured for providing a heat transfer medium for facilitated heat exchange in one or more of said heat exchangers, providing the possibility for heat storage in the heat transfer medium and for avoiding gas/gas heat exchangers, which are expensive, large and which may pose control scheme challenges.

In a typical process layout according to the prior art at steady state processing, raw process gas is heated in the process gas heater to about 400° C. The hot process gas is directed to the converter and the $SO_2$ is partially oxidized in the $1^{st}$ catalytic bed generating a temperature increase of about 25° C. for every 1% $SO_2$ in the feed, e.g. to about 475° C. for 3% $SO_2$. To have a high conversion in the converter, it is, due to the equilibrium between $SO_2$ and $SO_3$, necessary to cool the process gas before further conversion can be achieved. Therefore the process gas is cooled to around 400° C. before the gas is directed to the $2^{nd}$ catalytic bed for further conversion. If even higher conversion is required, a further cooling/conversion step can be added. Finally the process gas is cooled in the oxidized process gas cooler to a temperature above the dew point temperature of sulfuric acid, typically to a temperature between 270-290° C., such that the materials in the $SO_2$ converter may be chosen without considering the high corrosion resistance required where there is a risk for condensation of sulfuric acid.

For cold raw process gasses (below 200° C.), a heat recovery system with molten salt as energy carrier is often the preferred choice, in which, the molten salt is heated to medium temperature in the oxidized process gas cooler and to high temperatures in a converter heat exchanger, which may be configured either as an inter-bed cooler (between beds of catalyst), as heat exchangers external to the reactor (in which a process gas stream is withdrawn from the reactor to the heat exchanger and back to the next bed of catalyst) or as integrated heat exchangers in contact with catalyst (inside the bed of catalyst), to obtain a temperature where the hot salt may be used to heat the raw process gas in the process gas heater. In order to obtain a feed gas temperature of e.g. 400° C. at the inlet to the converter, the hot salt need to be above 400° C. and preferably above 430° C. In order to heat the molten salt to e.g. 430° C., the process gas temperature out of the $1^{st}$ catalytic bed need to be above 430° C., preferably more than 20° C. above, i.e. above 450° C. This means that for the process to run smoothly, the temperature increase over the $1^{st}$ catalytic bed should preferably be above 60° C. which means that the process gas should preferably contain more than 2½% $SO_2$.

A heat recovery system with gas/gas heat exchange is also known in the prior art. In this case the process gas is directed to be heated to intermediate temperature in the oxidized process gas cooler and to high temperatures in the interbed cooler, such that it may be fed at sufficient temperature to the first catalytic bed. While a gas/gas heat exchanger saves the cost related to the use of heat transfer medium in a separate circuit, it may also involve practical problems as it may have to be installed outside the reactor.

The thermal benefit of saving the energy transfer to and from heat transfer medium may in practice be balanced against poorer gas/wall heat transfer coefficients. Therefore in order to obtain a feed gas temperature of e.g. 400° C. inlet the converter, the process gas temperature out of the $1^{st}$ catalytic bed need to be above 400° C., preferably more than 50° C. above, i.e. above 450° C. This means that for the process to run smoothly, the temperature increase over the $1^{st}$ catalytic bed should preferably be above 60° C. which means that the process gas should preferably contain more than 2½% $SO_2$.

When sulfur trioxide and water are present in the process gas, sulfuric acid will start to form when the process gas is cooled below 400° C. in the oxidized process gas cooler. The reaction proceeds according to reaction (1).

$$SO_3(g)+H_2O(g)=H_2SO_4(g)+24.1 \text{ kcal/mole} \quad (1)$$

The hydration reaction is an exothermal reaction, and therefore, lower temperature will favour the formation of sulfuric acid. This means that the temperature of the process gas in the oxidized process gas cooler does not change linearly with the amount of energy transferred. This can be seen in FIG. 1, which shows heating and cooling curves for the oxidized process gas cooler. The solid line represent the process gas temperature as a function of the percentage of energy transferred, and the dot-dashed curve marked by □ indicates the corresponding temperature of a molten salt as a heat transfer medium. The process gas cooling curve is convex, meaning that the difference between two lines has a minimum within the heat exchanger, which causes a low overall temperature approach. Therefore a large heat exchange area is required in the oxidized process gas cooler due to the low overall temperature approach.

The only ways to improve the temperature approach with the given process layout are by decreasing the molten salt inlet temperature or by decreasing the molten salt outlet temperature by increasing the molten salt flow. The salt inlet temperature is limited by the sulfuric acid dew point of the process gas. The salt temperature should always be kept minimum 10° C. and preferably 15° C. above the sulfuric acid dew point, to avoid sulfuric acid condensation and corrosion. Furthermore, it is desirable to recover as much energy as possible in the oxidized process gas cooler, so normally the molten salt inlet temperature and process gas outlet temperature is already at the minimum allowable.

If the salt flow is increased, the salt outlet temperature will decrease, and it may not be possible to obtain a salt temperature at the inlet of the process gas heater which is high enough to obtain the required process gas temperature at the inlet of the SO₂ converter.

Furthermore, for feed gases with fluctuations in flow and SO₂ concentration, it can be difficult to control the temperatures in the plant. Specifically the process gas temperature at the inlet to the sulfuric acid condenser is important. On one hand the gas temperature must be kept above the sulfuric acid dew point of the gas to avoid sulfuric acid condensation and corrosion in the oxidized process gas cooler and ducting between the oxidized process gas cooler and sulfuric acid condenser. On the other hand, the gas temperature must be kept below the maximum operating temperature of the sulfuric acid condenser, which is typically limited to 300° C. due to the use of fluorinated polymers in the sulfuric acid condenser inlet. In the process according to the prior art the process gas temperature at the inlet to the sulfuric acid condenser is typically controlled by adjusting the salt flow to the oxidized process gas cooler via feed back PID control. If this is not sufficient, the control can be changed to a combination of feed-forward and feed back control, where measurements of the feed gas flow and SO₂ concentration are used as input for the feed forward calculation of the required salt flow. The feedback signal is then used to correct any measurement error, dynamic effects and other factors which cannot be accounted for in the feed forward calculation. However, even with combined feed-forward and feed back control, it can be difficult to maintain the desired gas temperature at the inlet to the sulfuric acid condenser.

The present disclosure suggests providing a high pressure boiler for providing the part of the heat exchange at lowest temperature, which traditionally is performed in the oxidized process gas cooler. Heating and cooling curves for the oxidized process gas coolers in the thermal management process can be seen in FIG. 1, where the dashed curve marked Δ correspond to molten salt and ◇ to the boiler. As it can be seen the combined curve of the disclosed process layout significantly increases the temperature approach in the oxidized process gas coolers compared to the process according to the prior art.

When operating with feed SO₂ concentrations close to or below the limit for auto-thermal operation, it is important that the steam generated in the 2$^{nd}$ oxidized process gas cooler can be used for heating the feed gas. Otherwise, the requirement for firing of support fuel will be increased.

Therefore, it is beneficial to introduce a steam condensing heat exchanger as the first step of heating the feed gas in the process gas heater.

A thermal management process according to the present disclosure will significantly reduce the total heat exchange area, and thus also the overall plant investment costs compared to the process according to the prior art.

Furthermore, the introduction of a boiler before the sulfuric acid condenser, has a significant stabilizing effect on the inlet temperature to the sulfuric acid condenser. The stabilisation is caused by the fact that the boiler is inherently stable, in that the temperature is defined by the boiling point of the water at the given pressure. This means that if the boiler is properly designed (i.e. as long as it contains liquid water, and has sufficient heat exchange surface), the gas temperature out of the boiler will be between 0 and 15° C. above the boiling point of the water in the boiler, regardless of the process gas flow or SO₃ concentration. Therefore no intervention from a plant operator or automatic process control device is required to control the temperature of the oxidized process gas.

These and other aspects of the present disclosure will be clear from inspecting of the following illustrations of specific embodiments of the present disclosure.

Figure 1:
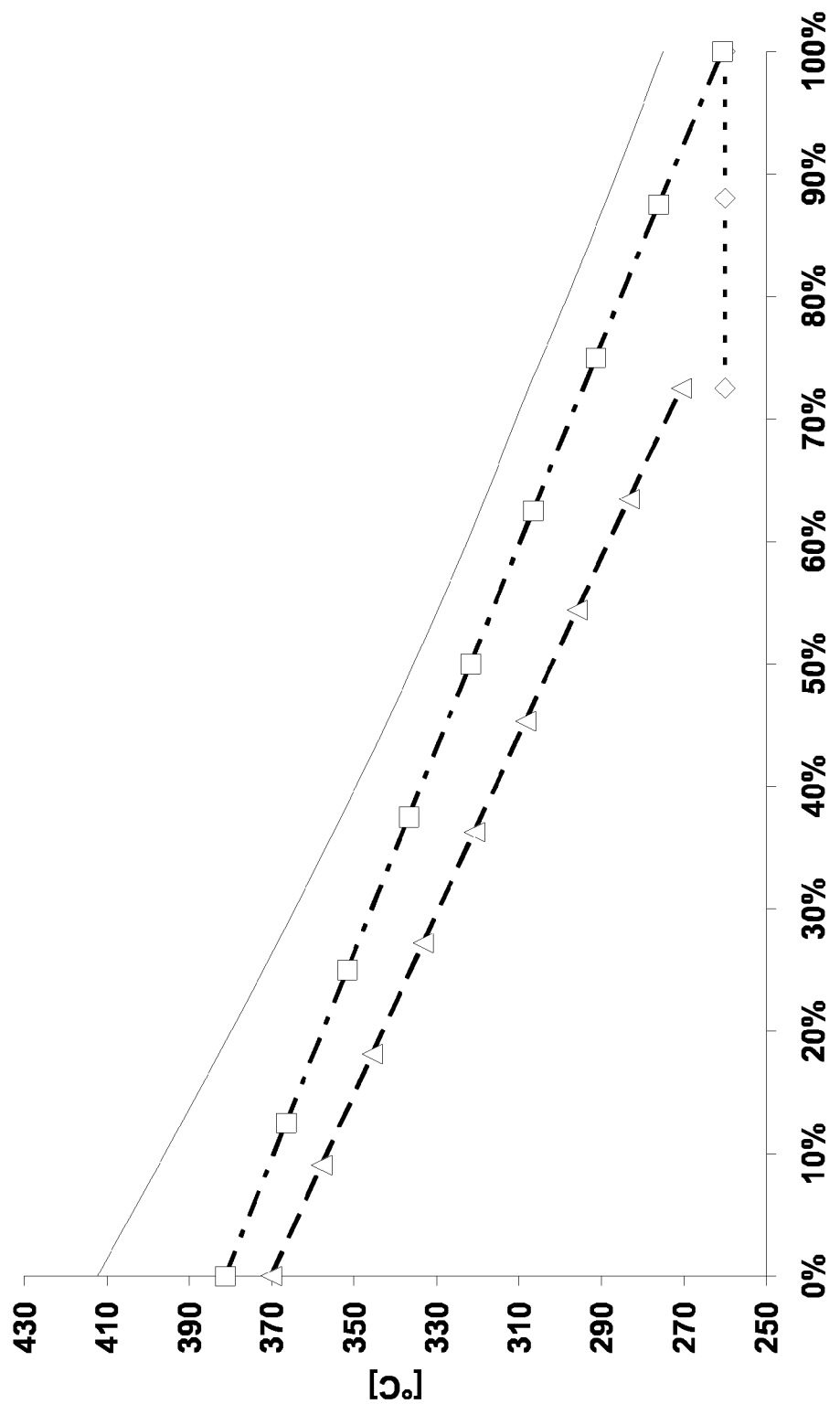
FIG. 1 shows temperature approach curves for the heat exchangers according to the prior art and the present disclosure.
Figure 2:
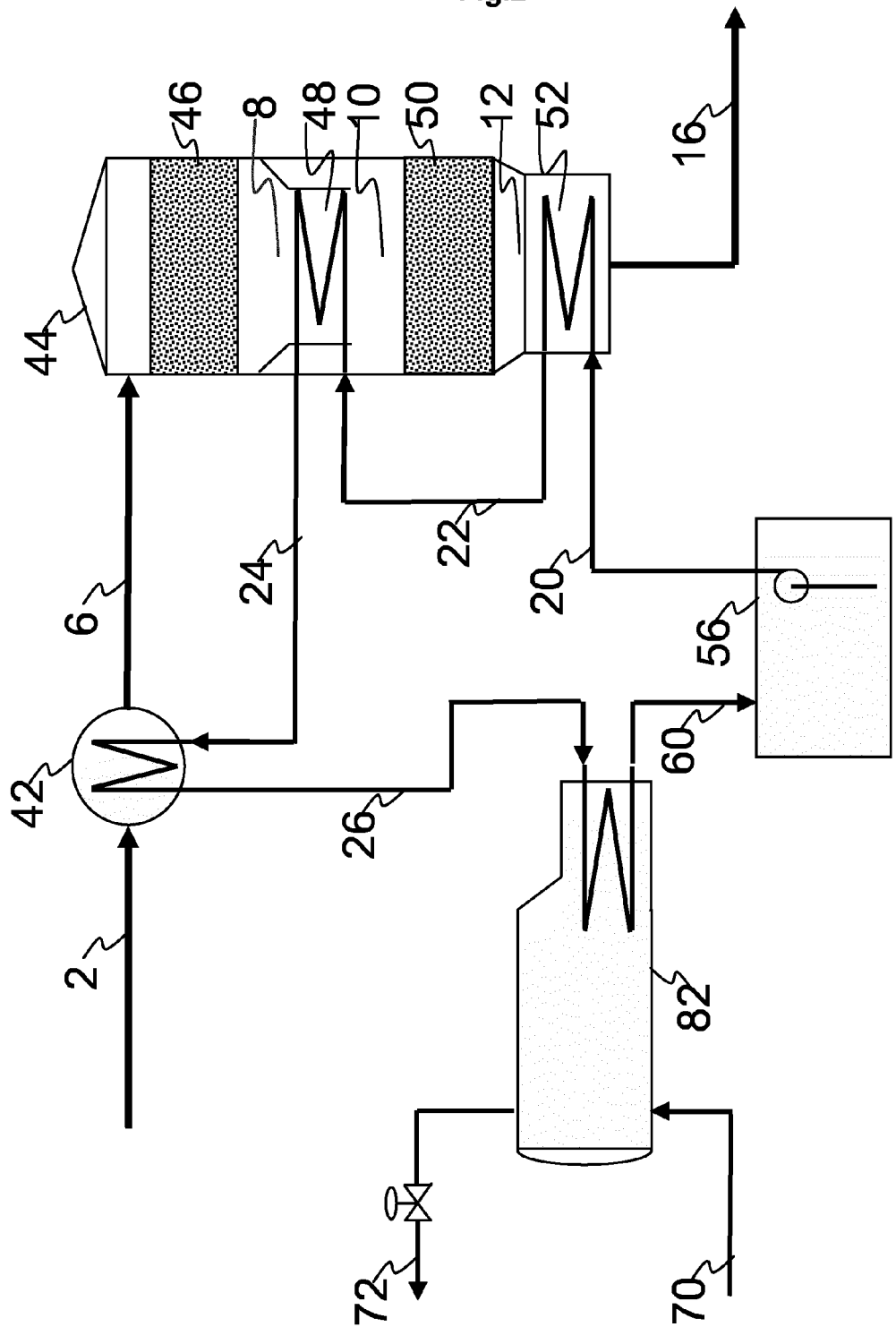
FIG. 2 shows a process layout according to the prior art.

FIG. 2 shows a typical process layout according to the prior art. According to this a raw process gas 2 at 180-200° C. containing about 8% water and 3% SO₂ is heated in the process gas heater 42 to about 400° C. The hot process gas 6 is directed to the converter 44 and the SO₂ is partially oxidized in the 1$^{st}$ catalytic bed 46. The oxidized gas 8 is cooled in an interbed cooler 48 to around 400° C. before the cooled oxidized gas 10 is directed to the 2$^{nd}$ catalytic bed 50 for further conversion. Finally the further oxidized process gas 12 is cooled in the oxidized process gas cooler 52 to a temperature above the dew point temperature of sulfuric acid, typically to a temperature between 270-290° C., providing a cooled further oxidized process gas 16, which may be directed to a sulfuric acid condenser.

In the thermal circuit of the process, molten salt 20 is heated to 380° C. in the oxidized process gas cooler 52 and to 450° C. in the interbed cooler 48, where after the hot salt 24 is used to heat the raw process gas 2 in the process gas heater 42. Excess energy in the cooled molten salt 26 may be transferred to an external steam circuit (70/72) by heat exchange in a kettle type boiler 82, before the cooled salt 60 is transferred to a salt tank 56.

Figure 3:
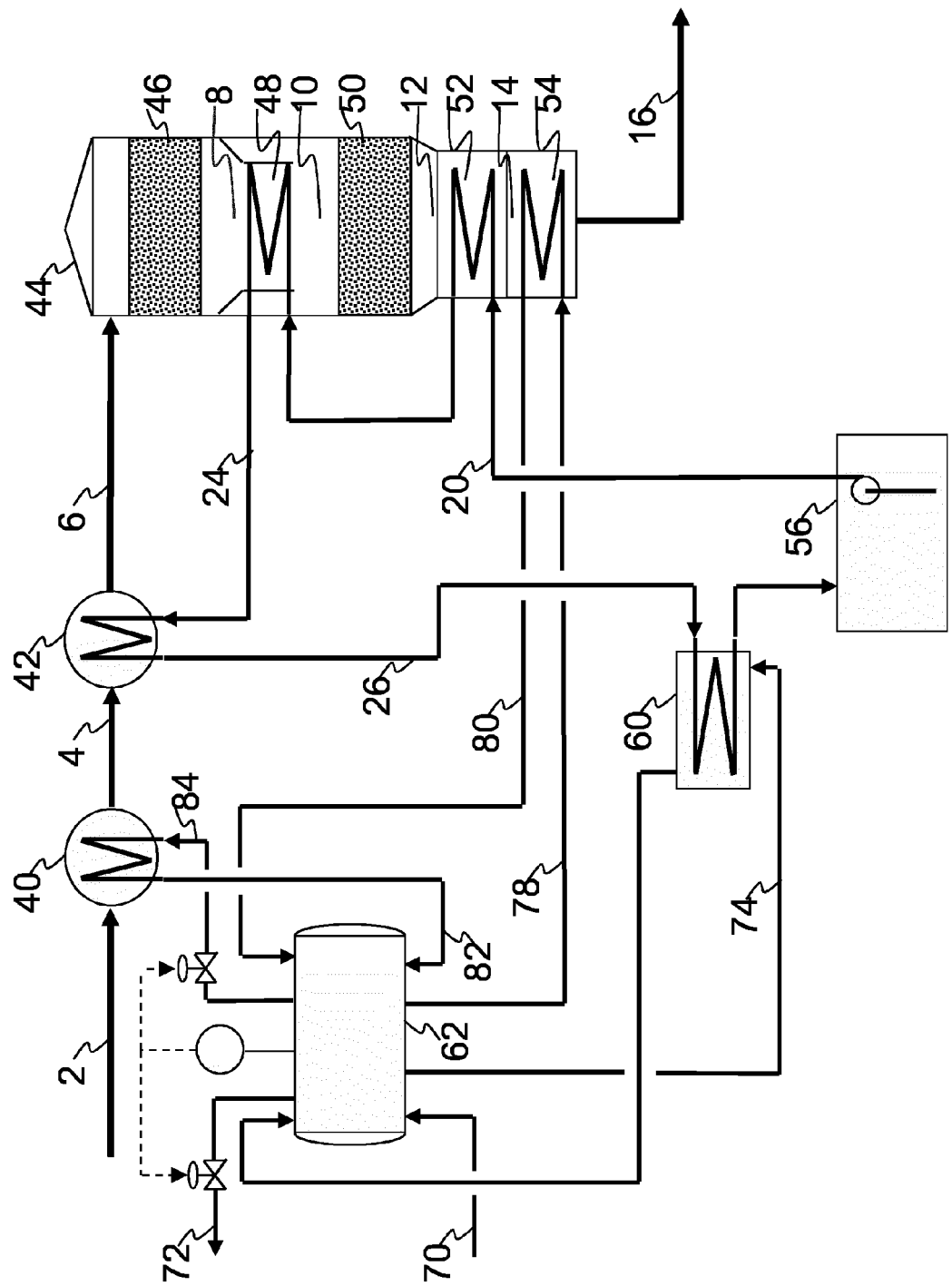
FIGS. 3, 4, 5 and 6 show different process layouts according to embodiments of the present disclosure.

FIG. 3 shows an embodiment of the present disclosure, in which a part of the heat exchange of the further oxidized process gas takes place in a high pressure boiler. Raw process gas 2 containing about 8% water and 3% SO₂ is heated in a steam heated process gas heater 40 to about 250° C., by heat exchange with condensing steam 84. This pre-heated process gas 4 is directed to a salt heated process gas heater 42, where it is heated to about 400° C. This hot process gas 6 is directed to the converter 44 and the SO₂ is partially oxidized in the 1$^{st}$ catalytic bed 46. The oxidized process gas 8 is cooled in an interbed cooler 48 to around 400° C. before the cooled oxidized gas 10 is directed to the 2$^{nd}$ catalytic bed 50 for further conversion. Finally the further oxidized process gas 12 is cooled to cooled further oxidized process gas 14 in a oxidized process gas cooler 52 and further cooled in a process gas heated boiler 54 to a temperature between 270-290° C.

In the thermal circuit of the process, molten salt 20 is heated to medium temperature in the oxidized process gas cooler 52 and to high temperatures in the interbed cooler 48, where after the hot salt 24 is used to heat the pre-heated process gas 4 in the process gas heater 42.

In the process gas heated boiler 54 operating at 46 barg a stream of water 78 is heated to the boiling point around 260° C., and transferred as a mixture of water and steam 80 to a steam drum 62, feeding the first process gas heater 40, with saturated steam 84. Condensed water 82 is then transferred to the steam drum 62. Streams of water 78 and 74 from the steam drum 62 feed the process gas heated boiler 54 and a salt heated boiler 60, respectively.

The steam boiler may be in correspondence with an external steam circuit 70/72

Figure 4:
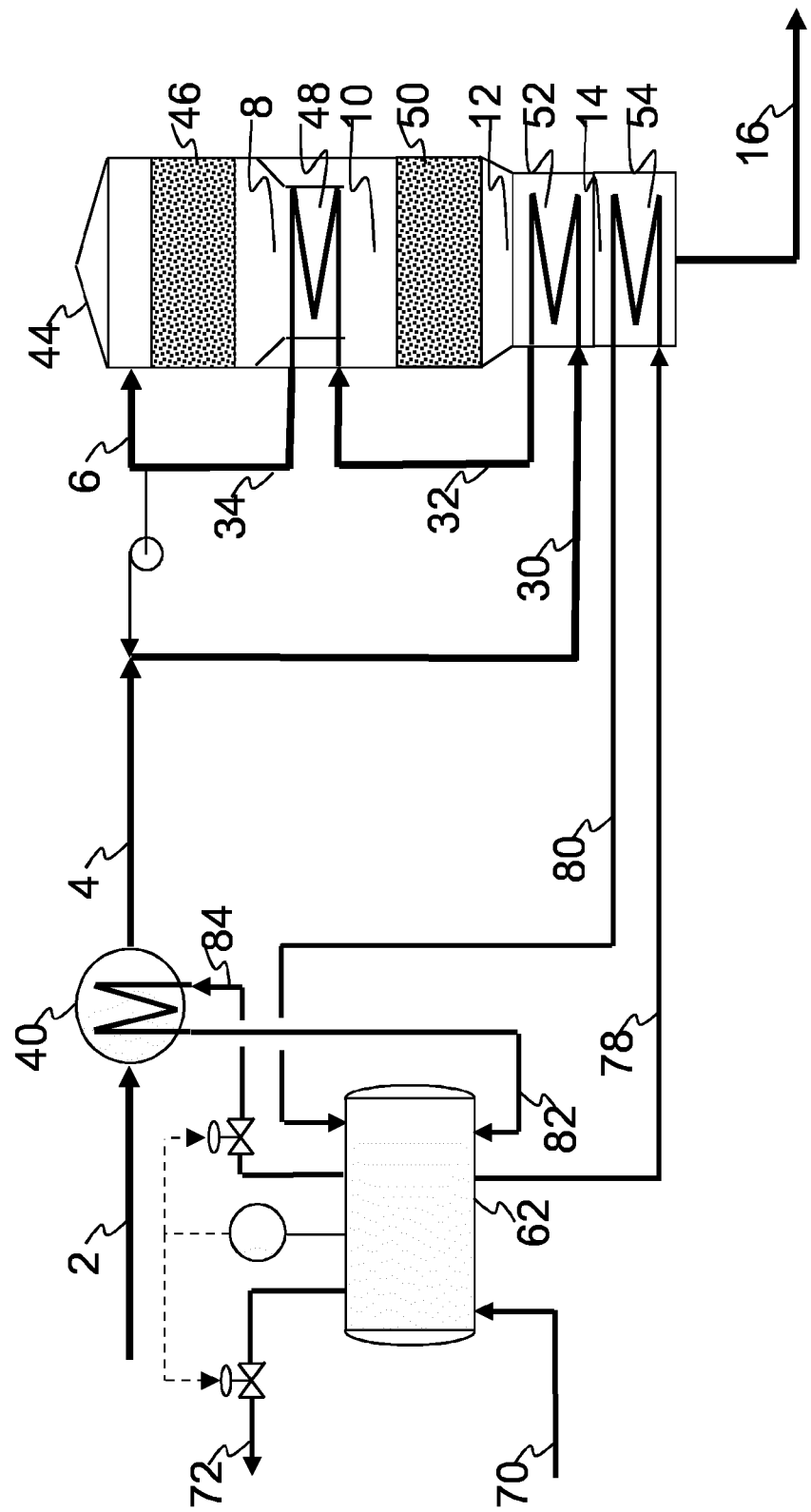

FIG. 4 shows an alternative embodiment in which heat exchange of the process gas is made in a gas/gas heat exchanger and in which a part of the heat exchange of the oxidized process gas cooler takes place in a high pressure boiler. Raw process gas 2 containing about 8% water and 3% $SO_2$ is heated in a steam heated process gas heater 40 to about 250° C., by heat exchange with condensing steam 84.

This pre-heated process gas 4 is directed to the cold side of the oxidized process gas cooler 52, and the interbed cooler 48, both being gas/gas heat exchangers, where it is heated to about 400° C. This hot process gas 6 is directed to the converter 44. A fraction of the hot process gas 6 may further (as shown in this embodiment) be combined with an process gas upstream the oxidized process gas cooler 52, in order to minimize the risk of condensation of hydrated $SO_3$ in the oxidized process gas cooler 52. The $SO_2$ is partially oxidized in the $1^{st}$ catalytic bed 46. The oxidized process gas 8 is cooled in the gas/gas interbed cooler 48 to around 400° C. before the cooled oxidized process gas 10 is directed to the $2^{nd}$ catalytic bed 50 for further conversion. Finally the further oxidized process gas 12 is cooled in the gas/gas oxidized process gas cooler 52 and further cooled in a process gas heated boiler 54 to a temperature between 270-290° C. The steam 80 generated in the boiler is used for pre-heating the raw process gas 2 in a manner similar to in FIG. 3.

Figure 5:
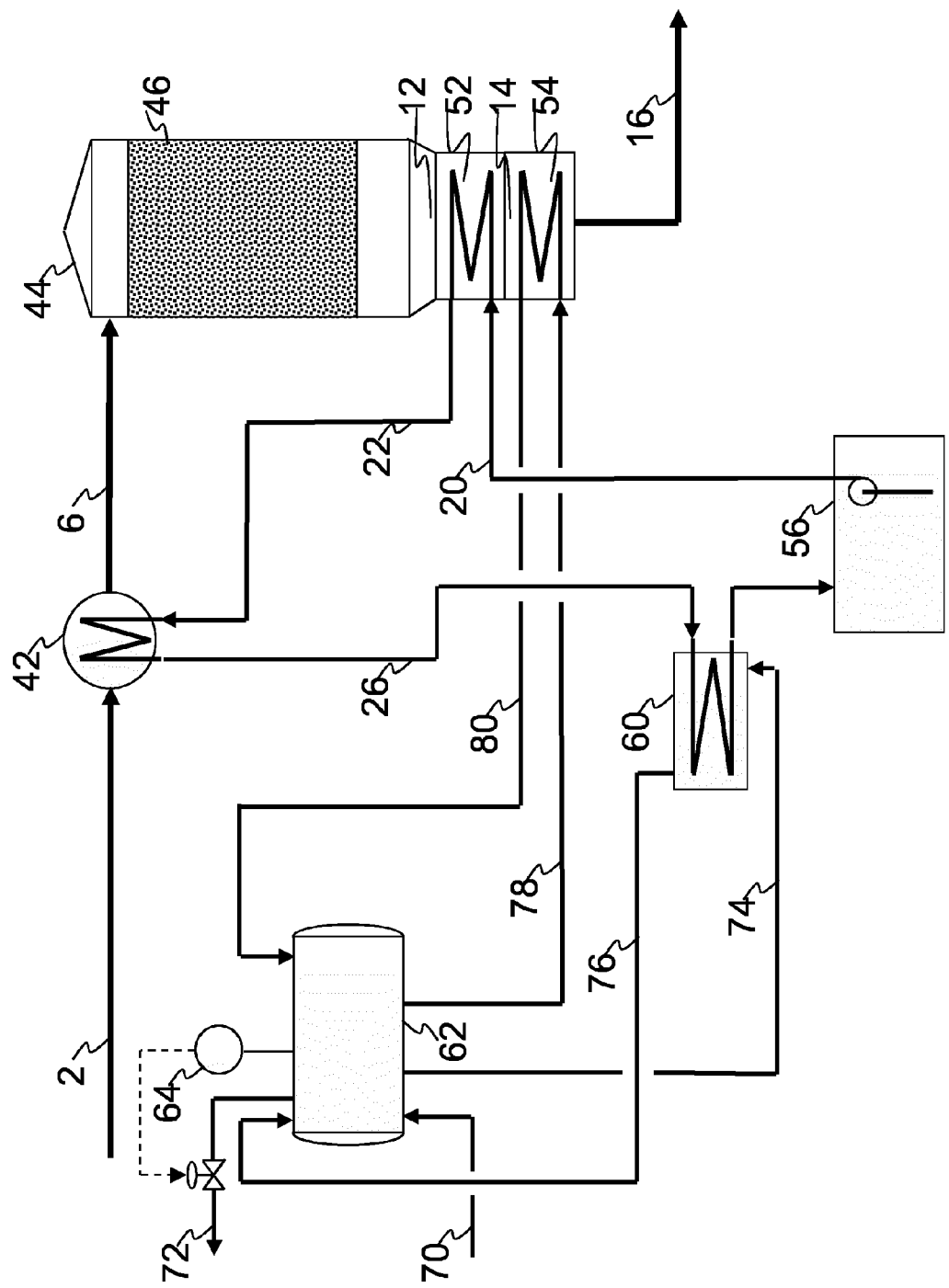

In a further embodiment shown in FIG. 5, the process may be simplified by providing only a single bed of catalytic material 46, without an interbed cooler and without preheating the raw process gas. This is a less efficient process layout, but the cost will also be lower. Analogously process conditions may also require the process to be configured with three beds of catalytic material.

An embodiment of the present disclosure may also involve an isothermal bed of catalytic material. Such an embodiment will involve active cooling of the bed of catalytic material, e.g. by cooling the bed of catalytically active material by heat exchange with process gas or a heat transfer medium, such as molten salt or atmospheric air.

Figure 6:
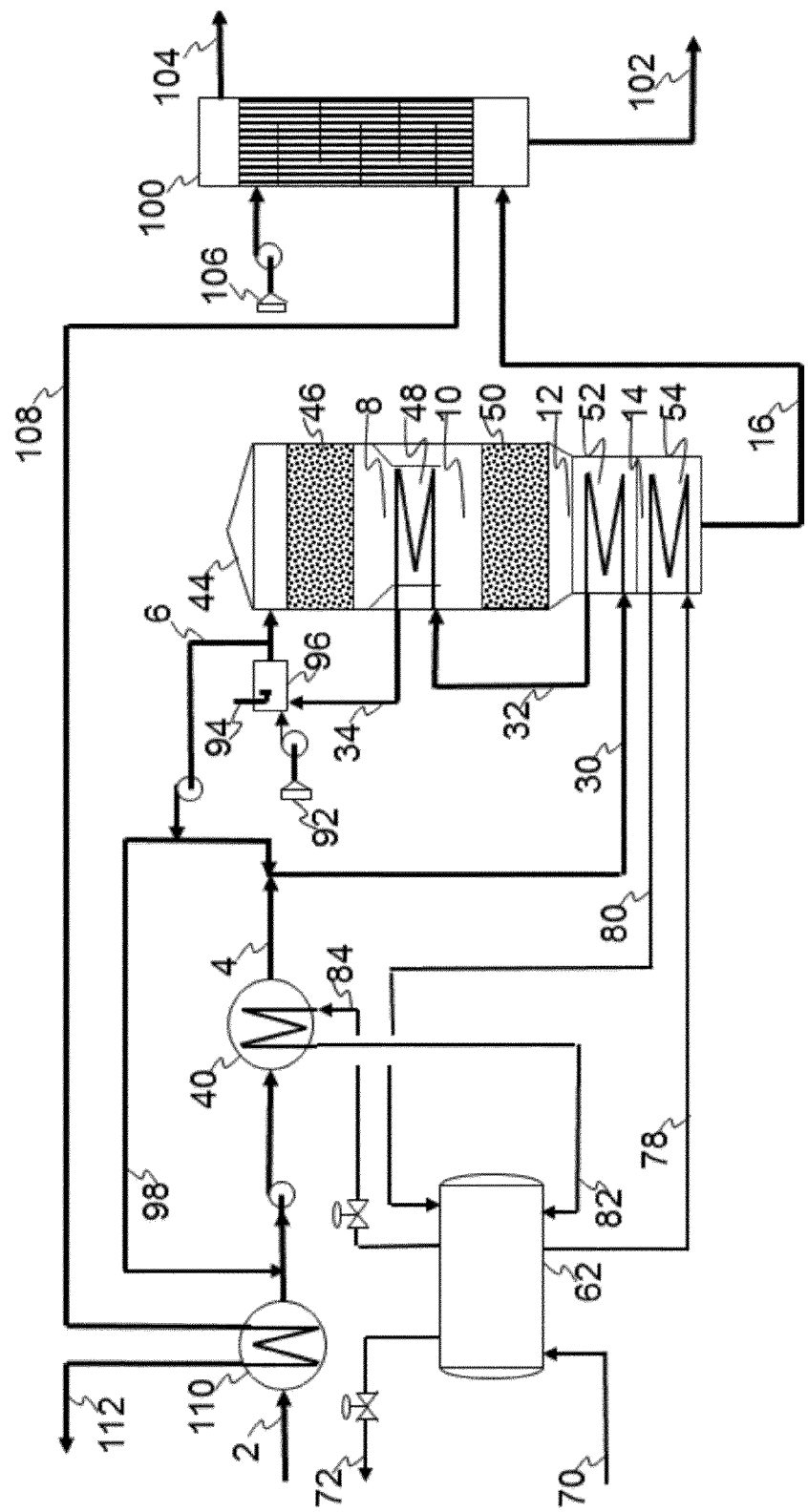
Figure 7:
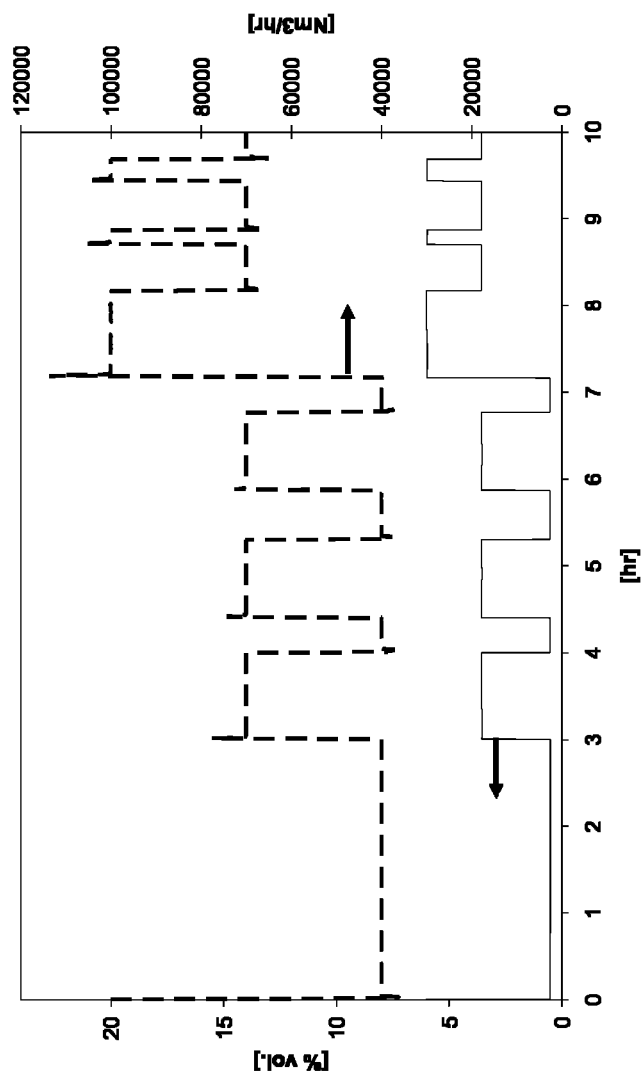
FIG. 7 shows exemplary feed gas composition and flow.

FIG. 6 shows in a further aspect of the present disclosure a plant for production of sulfuric acid. In this embodiment $SO_3$ is hydrated to $H_2SO_4$ primarily in the heat exchanger 52 and the boiler 54 before being directed to a condenser 100, in which the cooled further oxidized process gas is further cooled below the sulfuric acid dew point temperature with cooling air 106, such that sulfuric acid is condensed and withdrawn in a sulfuric acid line 102, providing a desulfurized gas 104, which may be directed to a stack for release to the atmosphere. The cooling air 106 is heated in the condenser 100 and withdrawn as heated air 108, which may be used for preheating the raw process gas 2. In the specific embodiment of FIG. 6, further energy is provided to the process by means of a support burner 96, in which a support fuel 94 such as liquid propane gas is combusted with air 92, for increasing the temperature of the pre-heated process gas 34, which according to this embodiment has been pre-heated by heat exchange with heated air in heat exchanger 110, with steam in heat exchanger 40, with further oxidized process gas in the oxidized process gas cooler 52 and preheated in the interbed cooler 48. The hot process gas may further (as shown in this embodiment) be combined with upstream process gas, in order to minimize the risk of condensation of hydrated $SO_3$ in the oxidized process gas cooler 52. As in the embodiments of FIGS. 3, 4 and 5 the use of a boiler 54 has the benefits of increasing the temperature difference in the last part of the process, and of stabilizing the temperature in the further oxidized process gas directed to the condenser.

EXAMPLE 1

A unit for treating 30,000 Nm3/h off-gas from a stable operating metallurgical plant containing 3.42% vol. $SO_2$, 12.53% vol. $O_2$, 7.12% vol. $H_2O$ is illustrated in Example 1.

Component balances are inert, i.e. $N_2$, Ar and $CO_2$.

Table 1 shows performance data and required heat exchange area for each of the three heat exchangers in the process according to the prior art.

TABLE 1

| | Process according to the prior art | | | | | |
|---|---|---|---|---|---|---|
| Heat exchanger | Heat exchanger duty [Gcal/h] | MTD [° C.] | Shell side heat transfer coefficient (gas) [kcal/m²/h/° C.] | Tube side heat transfer coefficient (salt) [kcal/m²/h/° C.] | Overall heat transfer coefficient [kcal/m²/h/° C.] | Area required [m²] |
| Process gas heater (salt) | 2.54 | 51 | 366 | 1140 | 245 | 202 |
| Interbed cooler (salt) | 0.94 | 41 | 244 | 861 | 181 | 132 |
| Oxidized process gas cooler (salt) | 1.89 | 13 | 265 | 471 | 170 | 873 |
| Total | | | | | | 1207 |

MTD: Mean Temperature Difference

Table 2 shows performance data and required heat exchange area for each of the five heat exchangers in the disclosed process.

TABLE 2

Combined steam/salt thermal management

| Heat exchanger | Heat exchanger duty [Gcal/h] | MTD [° C.] | Shell side heat transfer coefficient (gas) [kcal/m²/h/° C.] | Tube side heat transfer coefficient (salt/steam/water) [kcal/m²/h/° C.] | Overall heat transfer coefficient [kcal/m²/h/° C.] | Area required [m²] |
|---|---|---|---|---|---|---|
| 1st Process gas heater (steam/cond.) | 0.58 | 35 | 351 | 8530 | 324 | 55 |
| 2nd Process gas heater (salt) | 1.96 | 37 | 325 | 816 | 214 | 247 |
| Interbed cooler (salt) | 0.94 | 48 | 324 | 1008 | 230 | 90 |
| 1st oxidized process gas cooler (salt) | 1.31 | 36 | 306 | 655 | 208 | 183 |
| 2nd oxidized process gas cooler (water/steam) | 0.58 | 28 | 357 | 8678 | 332 | 67 |
| Total | | | | | | 642 |

Both processes are designed with the same total process gas (shell side) pressure drop of 35 mbar.

Comparison of the total heat exchange area required for the two process layouts show a reduction of 46% of the total heat exchange area in the disclosed process compared to the process according to the prior art.

The main reduction comes from the oxidized process gas cooler, which total area is reduced from 873 m² in the process according to the prior art to 250 m² in the disclosed process. The reduction is mainly caused by the increased temperature approach of 36/28° C. in the disclosed process versus 13° C. in the process according to the prior art.

The required heat exchange area in the interbed cooler is also decreased, due to a better temperature approach.

However, the total area of the process gas heater is increased from 202 m² to 302 m² in the disclosed process. This increase is caused by a reduction in the temperature approach from 51° C. in the process according to the prior art to 35/37° C. in the disclosed process. The increased area in the process gas heater, is however, by far compensated for by the much larger reduction in area of the oxidized process gas cooler.

EXAMPLE 2

A unit for treating a fluctuating off-gas from a metallurgical plant is illustrated in Example 2.
1) 40,000 Nm³/h, 0.5% vol. SO₂, 13.4% vol. O₂, 8.3% vol. H₂O
2) 70,000 Nm³/h, 3.5% vol. SO₂, 13.4% vol. O₂, 8.3% vol. H₂O
3) 100,000 Nm³/h, 6.0% vol. SO₂, 13.4% vol. O₂, 8.3% vol. H₂O Component balances are inert, i.e. N₂, Ar and CO₂.

The feed gas conditions vary between the three load cases shown above on an hourly basis, due to batch operation in the upstream smelter process.

Figure 8:
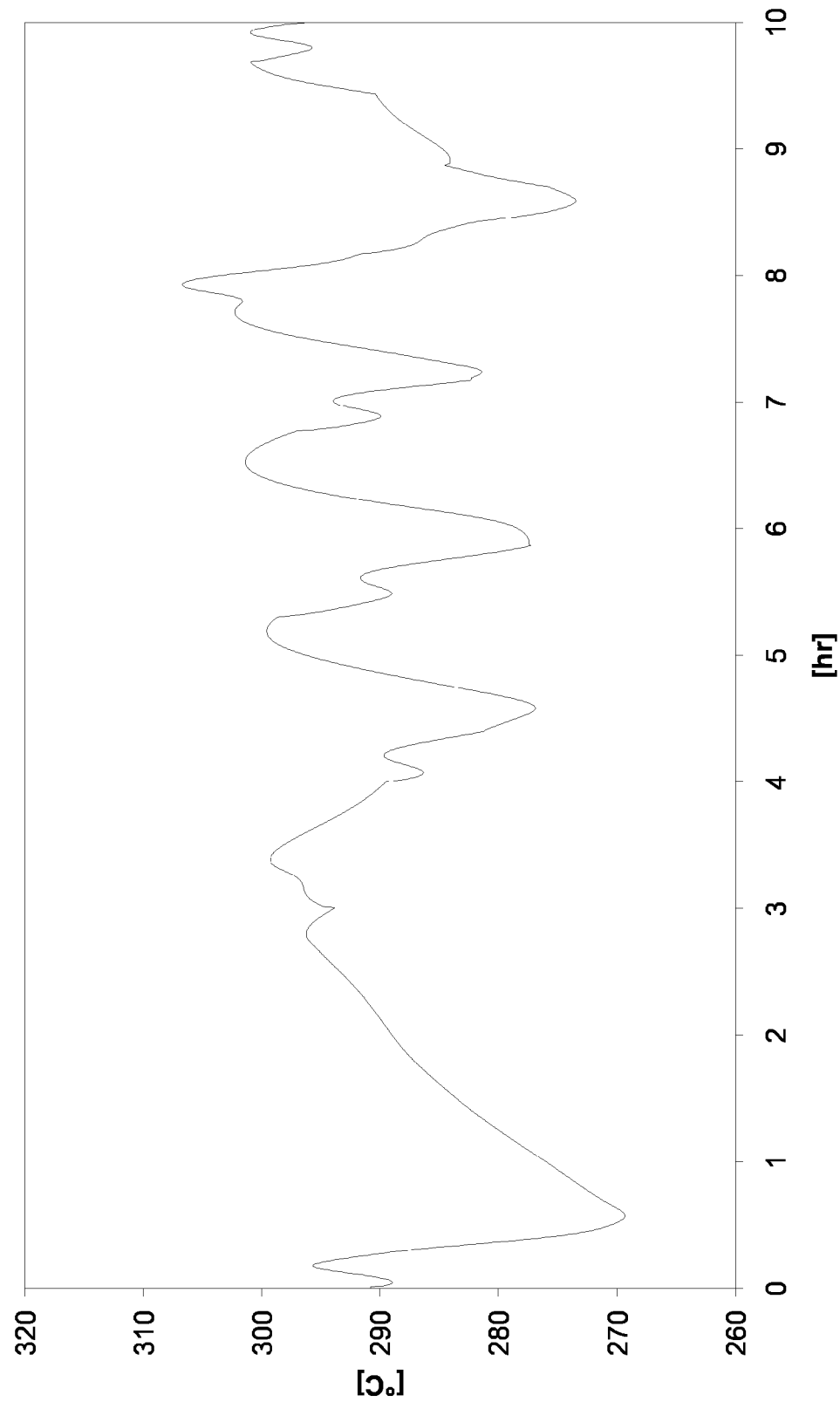
FIGS. 8, 9 and 10 show exemplary data for the gas temperature.
Figure 9:
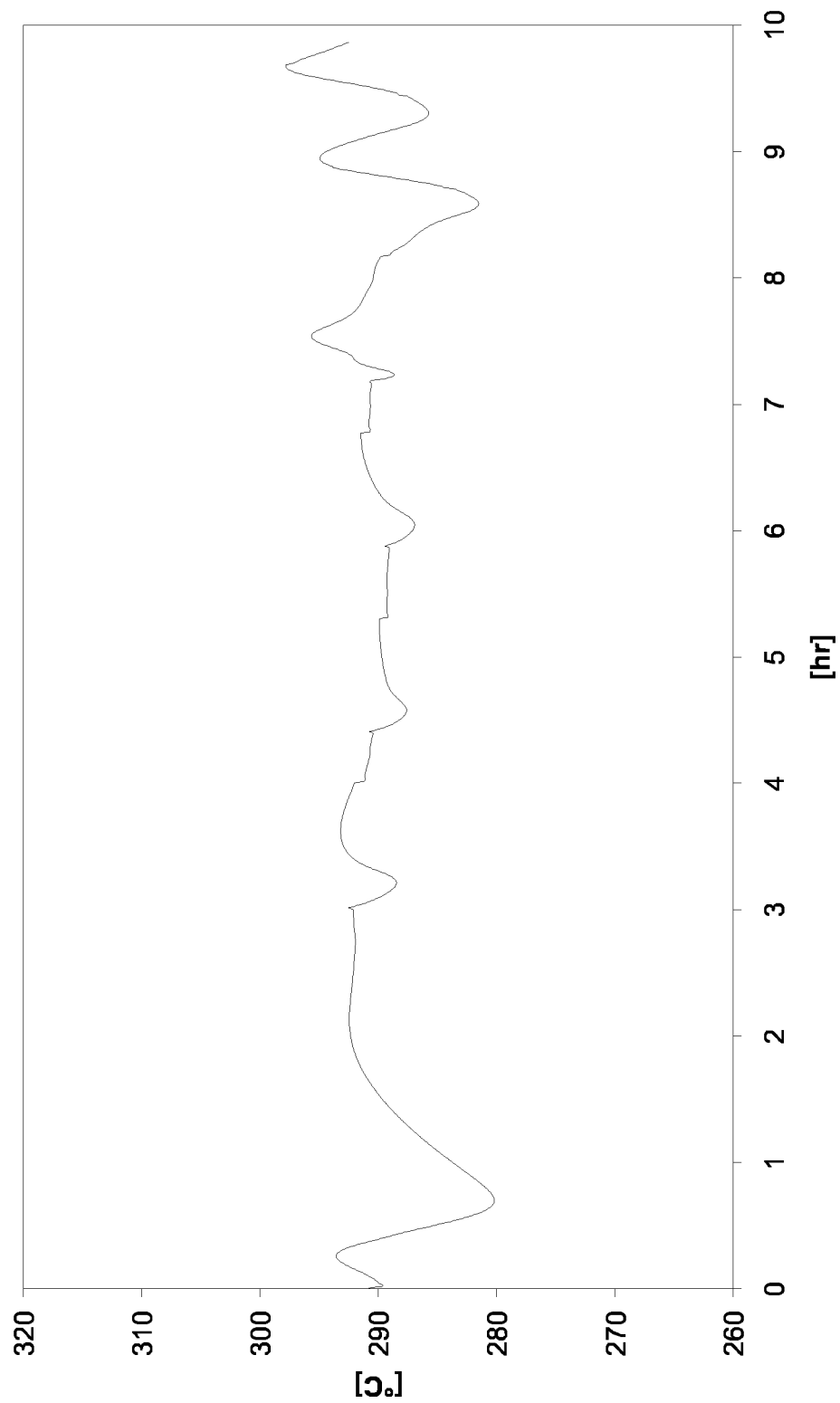

An example of the time variation of feed gas flow (dashed curve) and SO₂ concentration (solid curve) is shown in FIG. 6. Dynamic simulations of the entire sulfuric acid plant have been performed. The gas temperature at the inlet to the sulfuric acid condenser with feed back control alone and a combination of feed-forward and feedback control with the process according to the prior art is shown in FIG. 8 and FIG. 9, respectively. As it can be seen in FIG. 8, it is not possible to maintain the gas temperature at the inlet to the sulfuric acid condenser below the maximum operating temperature of 300° C. with feedback control. With combined feed-forward and feedback control, the gas temperature is somewhat stabilised and kept within the required temperature range as it is seen in FIG. 9.

Figure 10:
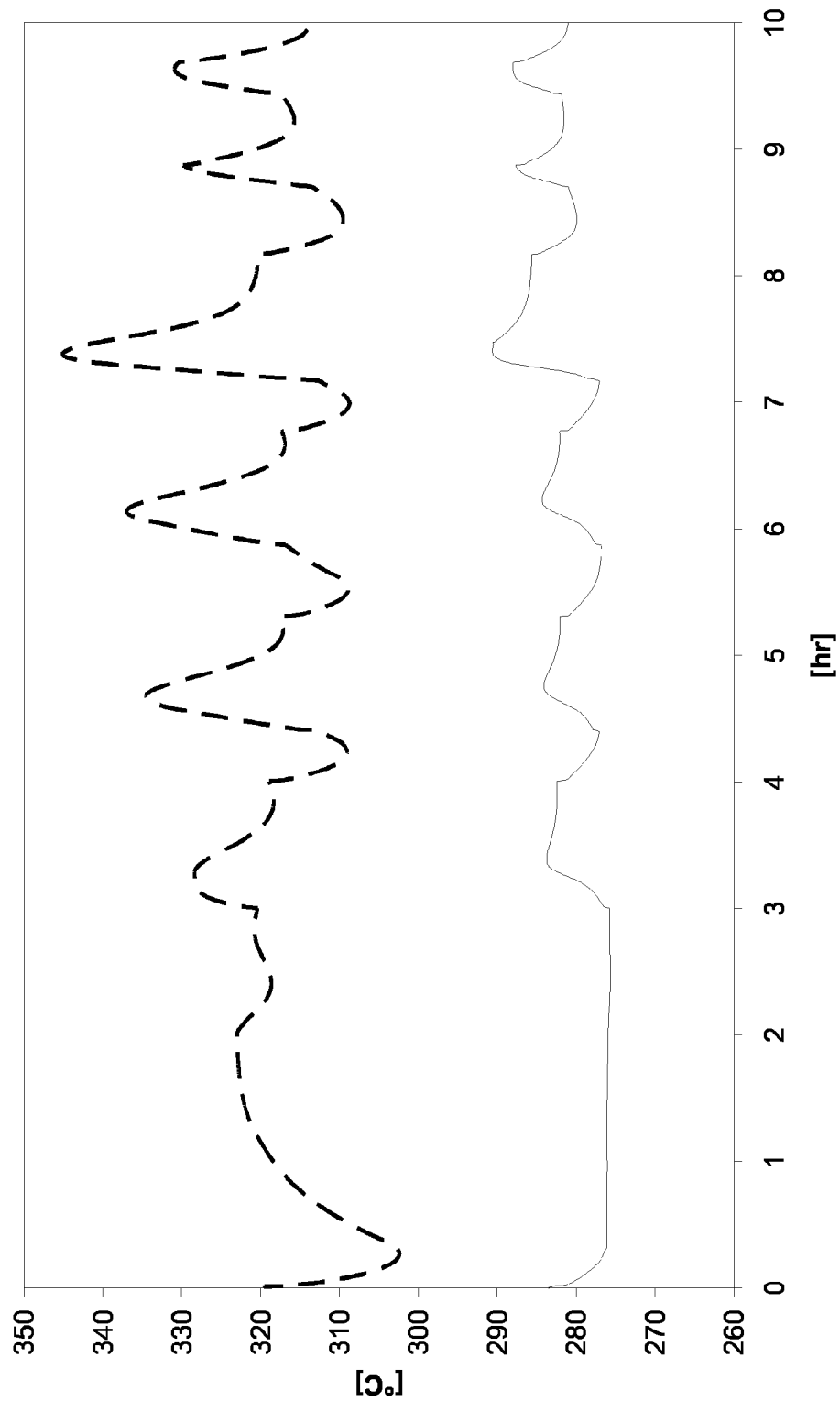

FIG. 10 shows the temperature at the inlet to the sulfuric acid condenser (solid line) according to the disclosed process. The gas temperature at the inlet to the 2$^{nd}$ oxidized process gas cooler is controlled using feedback control.

As it can be seen the gas temperature is now significantly stabilised and kept safely within the required operating range, even though the temperature out of the 1$^{st}$ oxidized process gas cooler varies (dashed line). Further improvements could in principle be introduced by using combined feed-forward and feedback control of the temperature out of the 1$^{st}$ oxidized process gas cooler.

The invention claimed is:

1. A process for conversion of SO₂ to SO₃ in a raw process gas comprising the steps of:
   a) heating the raw process gas by heat exchange with an oxidized process gas, providing a heated process gas;
   b) contacting the heated process gas with a first zone of catalyst active in oxidation of SO₂ to SO₃, providing an oxidized process gas;
   c) withdrawing heat of reaction from one or both of the first zone of catalytically active material and the oxidized process gas to the raw process gas, by one or more heat transfer processes taken from the group consisting of convection, conduction, radiation, gas/gas heat exchange or by heat transfer medium facilitated heat exchange; and
   d) further cooling the oxidized process gas by heat exchange in a boiler, receiving a feed of water, providing saturated steam and a cooled oxidized process gas in which the raw process gas, the heated process gas, the oxidized process gas and the cooled oxidized process gas is non-condensing with respect to sulfuric acid.

2. A process according to claim 1 further comprising the steps of:

e) contacting the oxidized process gas with one or more further zones of material catalytically active in oxidation of $SO_2$ to $SO_3$, providing a further oxidized process gas, f) cooling the oxidized process gas and/or the further oxidized process gas by heat exchange with the a process gas upstream the first zone of catalytically active material, in one or more heat exchangers, configured either as interbed coolers, as heat exchangers external to the reactor or as integrated heat exchangers in contact with catalyst.

3. A process according to claim 1 further comprising the step of pre-heating the raw process gas by heat exchange with a steam flow, prior to heating the process gas by heat exchange with the oxidized process gas, providing a pre-heated process gas.

4. A process according to claim 1 further comprising the step of mixing a process gas upstream the first zone of catalytically active material with a recycled warm process gas.

5. A process according to claim 1 in which the heat exchange between the raw process gas and one or more of the oxidized process gas or the further oxidized process gas is made in part by gas/gas heat exchange.

6. A process according to claim 1 in which the heat exchange between the raw process gas and one or more of the oxidized process gas or the further oxidized process gas is in part made by heat exchange facilitated by a heat transfer medium.

7. A process according to claim 1, in which the raw process gas fluctuates in one or more of the parameters flow rate, pressure and $SO_2$ concentration.

8. A process according to claim 1, in which the temperature of the steam is at least 10° C. above the $H_2SO_4$ dew point of the cooled oxidized process gas.

9. A process according to claim 1, in which the temperature of the steam is at least 200° C.

10. A process according to claim 1, in which the raw process gas contains at least 2% $H_2O$ in excess to $SO_2$.

11. A process according to claim 1, in which the pressure of the steam is 30-100 barg.

12. A process according to claim 5 above, in which the heated heat transfer medium is cooled by heat exchange with boiling water or steam.

13. A process for production of sulfuric acid involving conversion of $SO_2$ to $SO_3$ according to claim 1, and subsequent condensation of sulfuric acid in a condenser cooled by heat exchange with a gas.

14. A process plant for conversion of $SO_2$ to $SO_3$ in a process gas, said process plant comprising:

a heat transfer medium circuit and a process gas flow line;

a converter having a first zone of material catalytically active in oxidation of $SO_2$ to $SO_3$ connected to said flow line for receiving process gas;

a heat exchanger configured for heating the process gas by heat exchange with an oxidized process gas and/or a further oxidized process gas by providing thermal contact between said process gas and said oxidized process gas and/or said further oxidized process gas, wherein a tube section of the heat transfer medium circuit extends within said converter to facilitate indirect heat transfer between the oxidized process gas and/or further oxidized process gas and the tube section of the heat transfer medium circuit; and a boiler configured for containing water including a water outlet line, a section of the water outlet line arranged downstream of the tube section to indirectly heat water by the oxidized process gas and/or the further oxidized process after said oxidized process gas has been cooled in the heat exchanger characterized in said boiler operating at a pressure defining the boiling temperature of the water as at least 10° C. above the sulphuric acid dew point of the oxidized process gas, wherein a water circuit of said boiler is not in liquid communication with said heat exchanger.

* * * * *